(12) United States Patent
McGough et al.

(10) Patent No.: US 11,056,788 B2
(45) Date of Patent: Jul. 6, 2021

(54) METHOD OF MAKING A DUAL-BAND YAGI-UDA ANTENNA ARRAY

(71) Applicant: Cisco Technology, Inc., San Jose, CA (US)

(72) Inventors: Erin Patrick McGough, Akron, OH (US); Stephen V. Saliga, Akron, OH (US); Thomas G. Lutman, Berlin Center, OH (US); Edward C. Kuhar, Concord, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 262 days.

(21) Appl. No.: 16/207,314

(22) Filed: Dec. 3, 2018

(65) Prior Publication Data

US 2019/0103674 A1 Apr. 4, 2019

Related U.S. Application Data

(62) Division of application No. 15/139,363, filed on Apr. 27, 2016, now Pat. No. 10,148,013.

(51) Int. Cl.
*H01Q 5/49* (2015.01)
*H04W 88/08* (2009.01)
(Continued)

(52) U.S. Cl.
CPC ............. *H01Q 5/49* (2015.01); *H01Q 1/2291* (2013.01); *H01Q 21/0075* (2013.01); *H04W 88/08* (2013.01); *H01Q 1/007* (2013.01)

(58) Field of Classification Search
CPC .. H01Q 5/49; H01Q 5/35; H01Q 5/40; H01Q 5/48; H01Q 5/50; H01Q 5/392; H01Q 11/02; H01Q 13/10; H01Q 19/00; H01Q 19/30; H01Q 21/0075; H01Q 1/00; H01Q 1/08; H01Q 1/38; H01Q 1/24; H01Q 1/243; H01R 9/0515; H04W 88/08
See application file for complete search history.

(56) References Cited

U.S. PATENT DOCUMENTS 6,819,287 B2 * 11/2004 Sullivan ................. H01Q 1/243
343/700 MS
7,423,593 B2 * 9/2008 Puente Baliarda ...... H01Q 1/36
343/700 MS
(Continued)

FOREIGN PATENT DOCUMENTS

EP 2445055 A1 * 4/2012 ............. H01Q 19/30

*Primary Examiner* — Peter Dungba Vo
*Assistant Examiner* — Jose K Abraham
(74) *Attorney, Agent, or Firm* — Merchant & Gould P.C.

(57) ABSTRACT

A fabrication method of a dual-band antenna array. The dual-band antenna array may comprise a trace split, a first frequency branch, and a second frequency branch. The trace split may feed the first frequency branch and the second frequency branch. The first frequency branch may comprise a first frequency branch geometry that may cause a majority of a current of a signal fed into the trace split to feed the second frequency branch when the signal comprises a second frequency. The second frequency branch may comprise a second frequency branch geometry that may cause the majority of the current of the signal fed into the trace split to feed the first frequency branch when the signal comprises a first frequency.

20 Claims, 8 Drawing Sheets

(51) Int. Cl.
*H01Q 21/00* (2006.01)
*H01Q 1/22* (2006.01)
*H01Q 1/00* (2006.01)

(56) References Cited

U.S. PATENT DOCUMENTS

| | | | | |
|---|---|---|---|---|
| 7,659,866 B1* | 2/2010 | Peng | H01Q 1/243 |
| | | | 343/893 |
| 8,179,323 B2* | 5/2012 | Shamblin | H01Q 1/38 |
| | | | 343/700 MS |
| 8,228,254 B2* | 7/2012 | Foltz | H01Q 9/0442 |
| | | | 343/795 |
| 8,666,450 B2* | 3/2014 | Huang | H01Q 5/378 |
| | | | 455/562.1 |
| 8,717,246 B2* | 5/2014 | Lu | H01Q 1/38 |
| | | | 343/795 |
| 8,816,919 B2* | 8/2014 | Kuramoto | H01Q 1/44 |
| | | | 343/718 |
| 8,992,250 B1* | 3/2015 | Hosler, Sr. | H01R 24/545 |
| | | | 439/582 |
| 9,118,119 B2* | 8/2015 | Huang | H01Q 5/50 |
| 9,142,886 B2* | 9/2015 | Lu | H01Q 19/30 |
| 9,397,394 B2* | 7/2016 | Cheng | H01Q 21/28 |
| 9,979,078 B2* | 5/2018 | Koskiniemi | H01Q 1/42 |
| 2002/0109633 A1* | 8/2002 | Ow | H01Q 9/0407 |
| | | | 343/700 MS |
| 2003/0231138 A1* | 12/2003 | Weinstein | H01Q 9/065 |
| | | | 343/795 |
| 2006/0273865 A1* | 12/2006 | Timofeev | H01Q 19/30 |
| | | | 333/161 |
| 2009/0046794 A1* | 2/2009 | Maruyama | H04B 7/10 |
| | | | 375/260 |
| 2010/0328163 A1* | 12/2010 | Abramov | H01Q 9/40 |
| | | | 343/702 |
| 2011/0090131 A1* | 4/2011 | Chen | H01Q 5/49 |
| | | | 343/815 |
| 2011/0241960 A1* | 10/2011 | Lu | H01Q 19/30 |
| | | | 343/833 |
| 2011/0273345 A1* | 11/2011 | Kuramoto | H01Q 9/285 |
| | | | 343/718 |
| 2011/0274146 A1* | 11/2011 | Huang | H01Q 1/38 |
| | | | 375/219 |
| 2013/0064149 A1* | 3/2013 | Huang | H01Q 5/35 |
| | | | 370/297 |
| 2013/0285866 A1* | 10/2013 | Watanabe | H01Q 5/49 |
| | | | 343/770 |
| 2014/0118196 A1* | 5/2014 | Koskiniemi | H01Q 19/106 |
| | | | 343/702 |
| 2014/0197995 A1* | 7/2014 | Lu | H01Q 19/30 |
| | | | 343/700 MS |
| 2014/0266919 A1* | 9/2014 | Chen | H01L 25/16 |
| | | | 343/700 MS |
| 2015/0069134 A1* | 3/2015 | Westrick | H01Q 1/48 |
| | | | 235/492 |
| 2015/0256213 A1* | 9/2015 | Jan | H04B 7/0602 |
| | | | 370/338 |
| 2015/0325924 A1* | 11/2015 | Cheng | H01Q 19/30 |
| | | | 343/702 |
| 2015/0340770 A1* | 11/2015 | Loh | H01Q 3/36 |
| | | | 343/833 |

\* cited by examiner

METHOD OF MAKING A DUAL-BAND YAGI-UDA ANTENNA ARRAY

RELATED APPLICATION

This application is a Division of co-pending U.S. application Ser. No. 15/139,363 entitled "Dual-Band Yagi-Uda Antenna Array" filed Apr. 27, 2016, (U.S. Pat. No. 10,148,013) which is incorporated herein by reference.

TECHNICAL FIELD

The present disclosure relates generally to dual-band antenna systems.

BACKGROUND

A wireless access point is a device that allows wireless devices to connect to a wired network using Wi-Fi, or related standards. The access point usually connects to a router (via a wired network) as a standalone device, but it can also be an integral component of the router itself. An access point is differentiated from a hotspot, which may be the physical space where the wireless service is provided.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

A dual-band antenna array may be provided. The dual-band antenna array may comprise a trace split, a first frequency branch, and a second frequency branch. The trace split may feed the first frequency branch and the second frequency branch. The first frequency branch may comprise a first frequency branch geometry that may cause a majority of a current of a signal fed into the trace split to feed the second frequency branch when the signal comprises a second frequency. The second frequency branch may comprise a second frequency branch geometry that may cause the majority of the current of the signal fed into the trace split to feed the first frequency branch when the signal comprises a first frequency.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

EXAMPLE EMBODIMENTS

Embodiments of the disclosure may provide a dual-band antenna system. For example, embodiments of the disclosure may solve at least two problems. First, embodiments of the disclosure may achieve a directive broadcast pattern at a reasonably compact size. In general, increasing the size of an element or array (increasing the element's length and/or adding radiating elements) may result in an increase in pattern directivity at certain locations in the far-field. However, oftentimes it may not be possible to integrate such "high-gain" arrays into access points that possess a reasonably low-profile design. Second, embodiments of the disclosure may solve the problem of "dual-banding" a naturally narrow-band antenna configuration. Embodiments of the disclosure may provide a solution in terms of electrical lengths. For example, it may be bounded below (in frequency) by the physical lengths of a resonators and above by a coaxial transition and the loss in the circuit board.

Figure 1A:
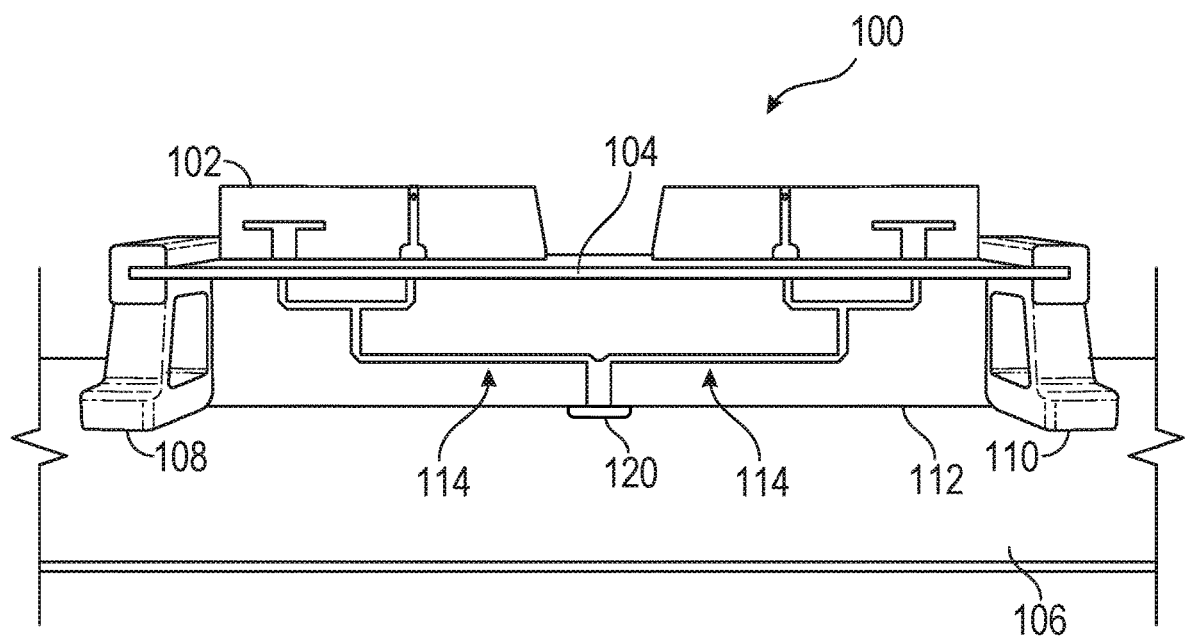
FIG. 1A and FIG. 1B show a side-view of a dual-band antenna system.
Figure 1B:
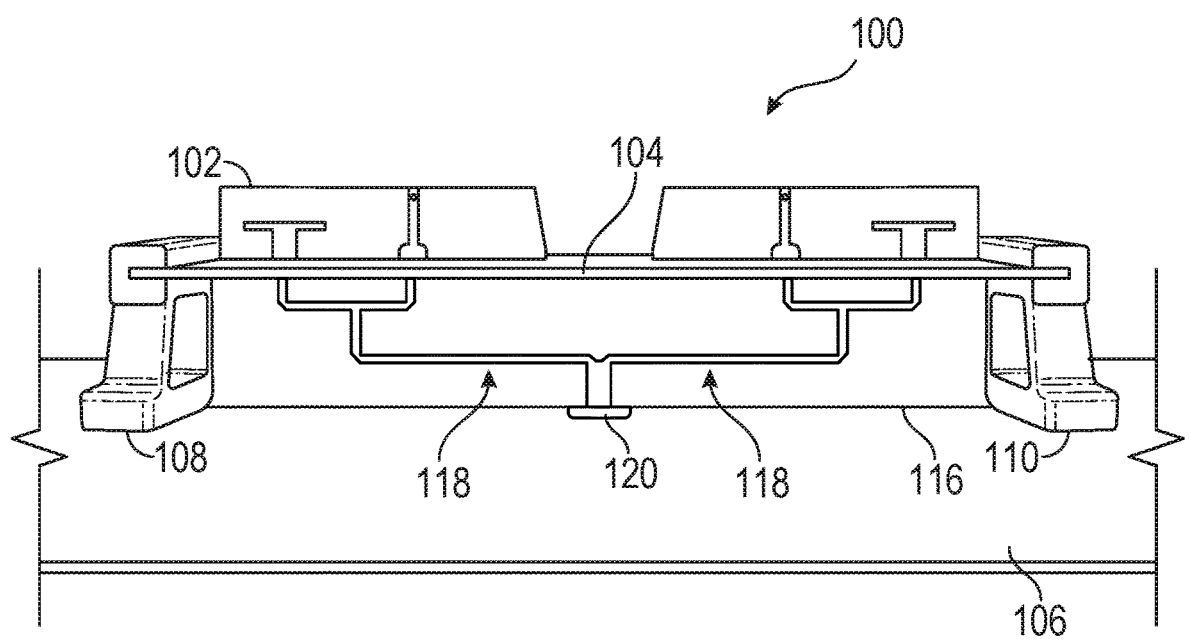

FIG. 1A and FIG. 1B show a dual-band antenna system 100 that may be used, for example, with a Wi-Fi access point. As shown in FIG. 1A and FIG. 1B, dual-band antenna system 100 may comprise a feed board 102, a driven element board 104, a ground plane 106, a first support 108, and a second support 110. Feed board 102 may comprise a driven side 112 that may include a driven side trace 114. On the side opposite driven side 112, feed board 102 may comprise a ground side 116 that may include a ground side trace 118. Driven side trace 114 and ground side trace 118 may be complementary and may mirror each other on both sides of feed board 102. Driven element board 104 may be perpendicular to feed board 102. Also, driven element board 104 may be parallel with ground plane 106. First support 108 and second support 110 may be attached to a top side of ground plane 106 and may hold feed board 102 and driven element board 104 in place. Ground plane 106 may comprise a ground plane opening 120.

Figure 1C:
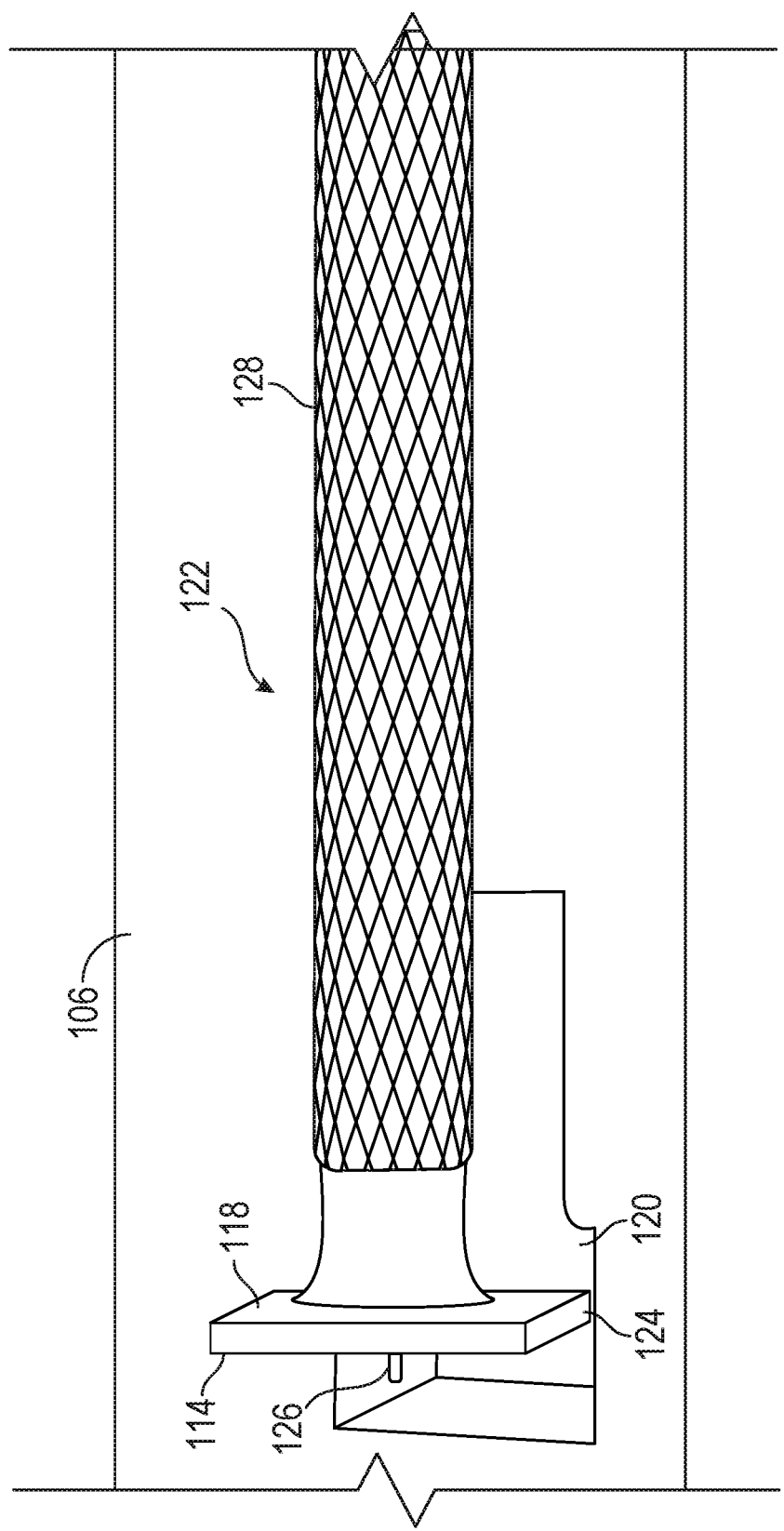
FIG. 1C shows a bottom side of ground plane.

FIG. 1C shows a bottom side of ground plane 106 that is opposite the top side of ground plane 106. As stated above, dual-band antenna system 100 may be used in conjunction with a Wi-Fi access point. Radio equipment (e.g., for the Wi-Fi access point) may be below ground plane 106 and may be exposed to the bottom side of ground plane 106. The radio equipment may drive a coaxial cable 122 comprising a center conductor 126 and a shield 128. A feed board tab 124 from feed board 102 may protrude through ground plane opening 120 to carry a portion of driven side trace 114 and ground side trace 118 to the bottom side of ground plane 106. On feed board tab 124, center conductor 126 of coaxial cable 122 may be connected to driven side trace 114 and shield 128 of coaxial cable 122 may be connected to ground side trace 118. In this way, the radio equipment may be connected to dual-band antenna system 100. As will be described in more detail below, the radio equipment may drive dual-band antenna system 100 with a first frequency and a second frequency (i.e., dual band).

Figure 2A:
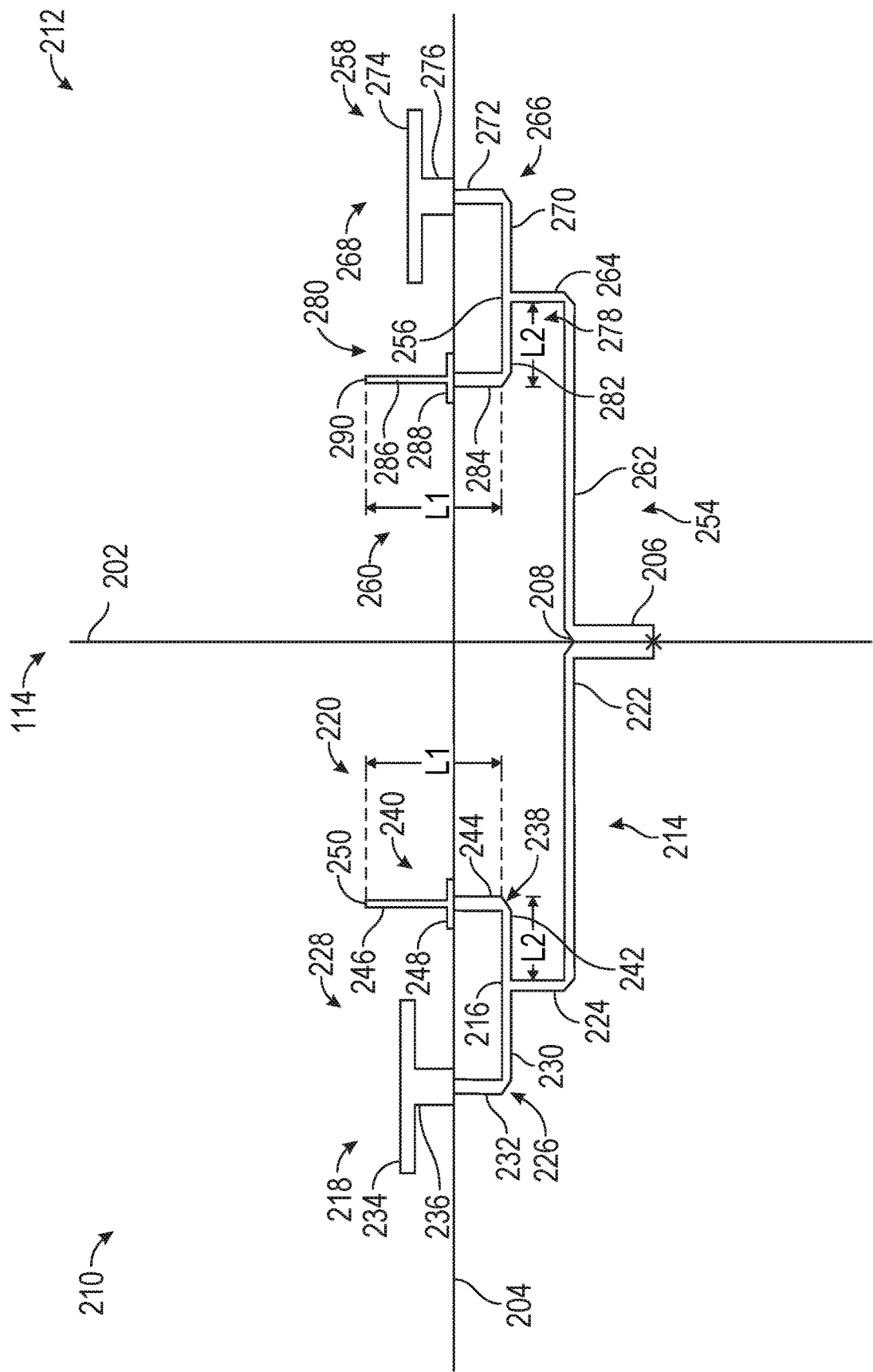
FIG. 2A and FIG. 2B show driven side trace.
Figure 2B:
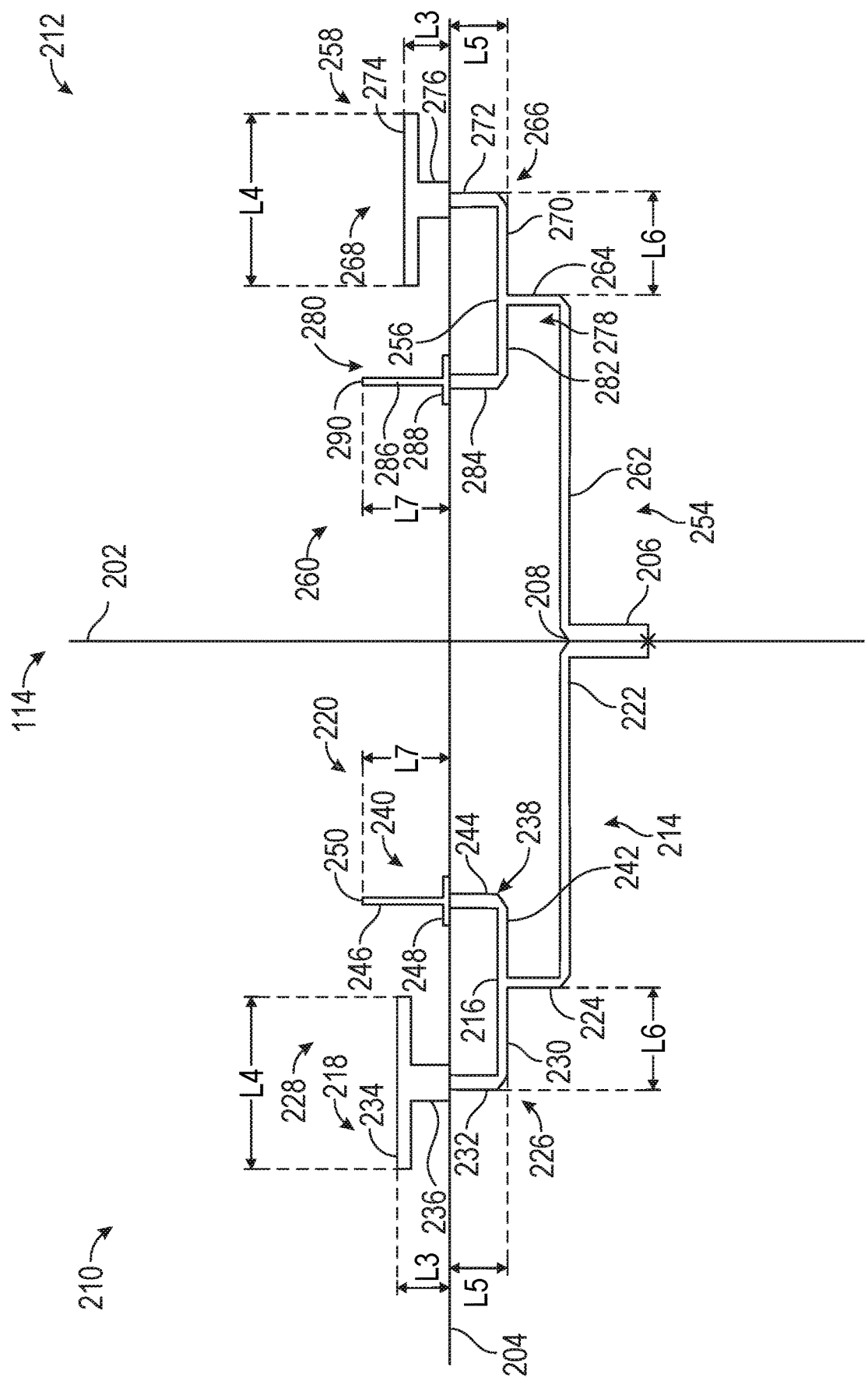

FIG. 2A and FIG. 2B show driven side trace 114 in more detail including a symmetry line 202 and an antenna plane 204. As shown in FIG. 2A and FIG. 2B, driven side trace 114 may comprise a driven side feeder 206 and a driven side feeder split 208. Driven side feeder 206 may be connected to and driven by center conductor 126 of coaxial cable 122. Driven side feeder split 208 may split driven side trace 114 to feed a driven side trace first section 210 and a driven side trace second section 212. Coaxial cable 122 (and driven side feeder 206) may comprise a 50 ohm line. Driven side feeder split 208 may split driven side trace 114 into two parallel 100 ohm lines.

Driven side trace first section 210 may comprise a driven side trace first section feeder 214 that feeds a driven side trace first section split 216. Driven side trace first section split 216 splits and feeds a driven side trace first section first frequency branch 218 and a driven side trace first section second frequency branch 220. As will be described in greater detail below, the geometry consistent with embodiments of the disclosure, may cause a current divorcing effect at driven side trace first section split 216 that may result in a signal on driven side trace first section feeder 214 at a first frequency to drive driven side trace first section first frequency branch 218 and a signal on driven side trace first section feeder 214 at a second frequency to drive driven side trace first section second frequency branch 220.

Driven side trace first section feeder 214 may comprise a driven side trace first section feeder first portion 222 and a driven side trace first section feeder second portion 224. Driven side trace first section first frequency branch 218 may comprise a driven side trace first section first frequency branch sub feeder 226 and a driven side trace first section first frequency resonator 228. Driven side trace first section first frequency branch sub feeder 226 may comprise a driven side trace first section first frequency branch sub feeder first portion 230 a driven side trace first section first frequency branch sub feeder second portion 232. Driven side trace first section first frequency resonator 228 may comprise a driven side trace first section first frequency resonator first portion 234 and a driven side trace first section first frequency resonator second portion 236.

Driven side trace first section second frequency branch 220 may comprise a driven side trace first section second frequency branch sub feeder 238 and a driven side trace first section second frequency resonator 240. Driven side trace first section second frequency branch sub feeder 238 may comprise a driven side trace first section second frequency branch sub feeder first portion 242 and a driven side trace first section second frequency branch sub feeder second portion 244. Driven side trace first section second frequency resonator 240 may comprise a driven side trace first section second frequency resonator first portion 246, a driven side trace first section second frequency resonator second portion 248, and a driven side trace first section second frequency resonator short circuit 250.

Driven side trace second section 212 may comprise a driven side trace second section feeder 254 that feeds a driven side trace second section split 256. Driven side trace second section split 256 splits and feeds a driven side trace second section first frequency branch 258 and a driven side trace second section second frequency branch 260. As will be described in greater detail below, the geometry consistent with embodiments of the disclosure, may cause a current divorcing effect at driven side trace second section split 256 that may result in a signal on driven side trace second section feeder 254 at a first frequency to drive driven side trace second section first frequency branch 258 and a signal on driven side trace second section feeder 254 at a second frequency to drive driven side trace second section second frequency branch 260.

Driven side trace second section feeder 254 may comprise a driven side trace second section feeder first portion 262 and a driven side trace second section feeder second portion 264. Driven side trace second section first frequency branch 258 may comprise a driven side trace second section first frequency branch sub feeder 266 and a driven side trace second section first frequency resonator 268. Driven side trace second section first frequency branch sub feeder 266 may comprise a driven side trace second section first frequency branch sub feeder first portion 270 a driven side trace second section first frequency branch sub feeder second portion 272. Driven side trace second section first frequency resonator 268 may comprise a driven side trace second section first frequency resonator first portion 274 and a driven side trace second section first frequency resonator second portion 276.

Driven side trace second section second frequency branch 260 may comprise a driven side trace second section second frequency branch sub feeder 278 and a driven side trace second section second frequency resonator 280. Driven side trace second section second frequency branch sub feeder 278 may comprise a driven side trace second section second frequency branch sub feeder first portion 282 and a driven side trace second section second frequency branch sub feeder second portion 284. Driven side trace second section second frequency resonator 280 may comprise a driven side trace second section second frequency resonator first portion 286, a driven side trace second section second frequency resonator second portion 288, and a driven side trace second section second frequency resonator short circuit 290.

Figure 3A:
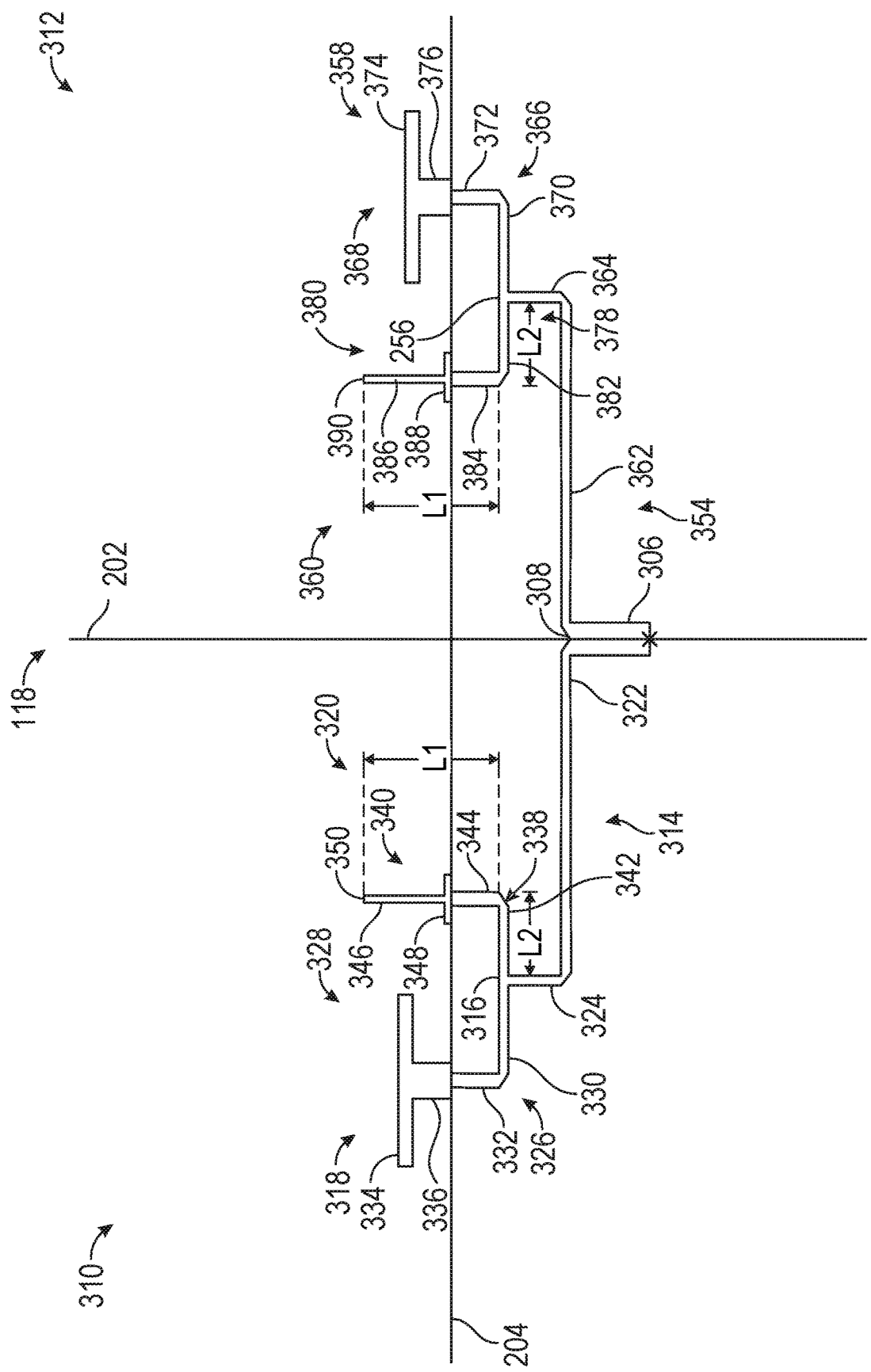
FIG. 3A and FIG. 3B show ground side trace.
Figure 3B:
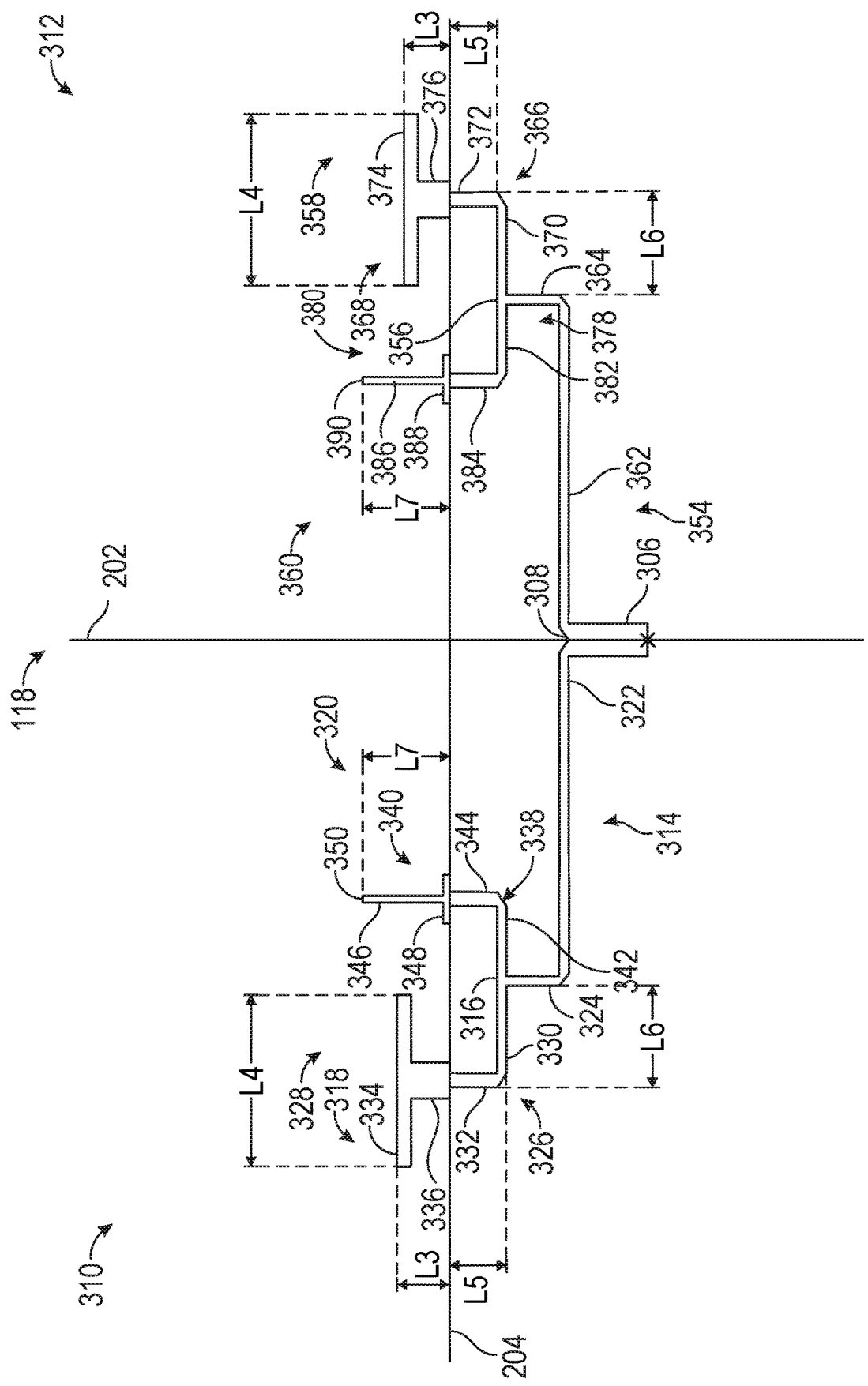

FIG. 3A and FIG. 3B show ground side trace 118 in more detail including a symmetry line 202 and an antenna plane 204. As shown in FIG. 3A and FIG. 3B, ground side trace 118 may comprise a ground side feeder 306 and a ground side feeder split 308. Ground side feeder 306 may be connected to shield 128 of coaxial cable 122. Ground side feeder split 308 may split ground side trace 118 to feed a ground side trace first section 310 and a ground side trace second section 312. Coaxial cable 122 (and ground side feeder 206) may comprise a 50 ohm line. Ground side feeder split 308 may split ground side trace 118 into two parallel 100 ohm lines.

Ground side trace first section 310 may comprise a ground side trace first section feeder 314 that feeds a ground side trace first section split 316. Ground side trace first section split 316 splits and feeds a ground side trace first section first frequency branch 318 and a ground side trace first section second frequency branch 320. As will be described in greater detail below, the geometry consistent with embodiments of the disclosure, may cause a current divorcing effect at ground side trace first section split 316 that may result in a signal on ground side trace first section feeder 314 at a first frequency to drive ground side trace first section first frequency branch 318 and a signal on ground side trace first section feeder 314 at a second frequency to drive ground side trace first section second frequency branch 320.

Ground side trace first section feeder 314 may comprise a ground side trace first section feeder first portion 322 and a ground side trace first section feeder second portion 324. Ground side trace first section first frequency branch 318 may comprise a ground side trace first section first frequency branch sub feeder 326 and a ground side trace first section first frequency resonator 328. Ground side trace first section first frequency branch sub feeder 326 may comprise a ground side trace first section first frequency branch sub feeder first portion 330 a ground side trace first section first frequency branch sub feeder second portion 332. Ground side trace first section first frequency resonator 328 may comprise a ground side trace first section first frequency resonator first portion 334 and a ground side trace first section first frequency resonator second portion 336.

Ground side trace first section second frequency branch 320 may comprise a ground side trace first section second frequency branch sub feeder 338 and a ground side trace first section second frequency resonator 340. Ground side trace first section second frequency branch sub feeder 338 may comprise a ground side trace first section second frequency branch sub feeder first portion 342 and a ground side trace first section second frequency branch sub feeder second portion 344. Ground side trace first section second frequency resonator 340 may comprise a ground side trace first section second frequency resonator first portion 346, a ground side trace first section second frequency resonator second portion 348, and a ground side trace first section second frequency resonator short circuit 350.

Ground side trace second section 312 may comprise a ground side trace second section feeder 354 that feeds a ground side trace second section split 356. Ground side trace second section split 356 splits and feeds a ground side trace second section first frequency branch 358 and a ground side trace second section second frequency branch 360. As will be described in greater detail below, the geometry consistent with embodiments of the disclosure, may cause a current divorcing effect at ground side trace second section split 356 that may result in a signal on ground side trace second section feeder 354 at a first frequency to drive ground side trace second section first frequency branch 358 and a signal on ground side trace second section feeder 354 at a second frequency to drive ground side trace second section second frequency branch 360.

Ground side trace second section feeder 354 may comprise a ground side trace second section feeder first portion 362 and a ground side trace second section feeder second portion 364. Ground side trace second section first frequency branch 358 may comprise a ground side trace second section first frequency branch sub feeder 366 and a ground side trace second section first frequency resonator 368. Ground side trace second section first frequency branch sub feeder 366 may comprise a ground side trace second section first frequency branch sub feeder first portion 370 a ground side trace second section first frequency branch sub feeder second portion 372. Ground side trace second section first frequency resonator 368 may comprise a ground side trace second section first frequency resonator first portion 374 and a ground side trace second section first frequency resonator second portion 376.

Ground side trace second section second frequency branch 360 may comprise a ground side trace second section second frequency branch sub feeder 378 and a ground side trace second section second frequency resonator 380. Ground side trace second section second frequency branch sub feeder 378 may comprise a ground side trace second section second frequency branch sub feeder first portion 382 and a ground side trace second section second frequency branch sub feeder second portion 384. Ground side trace second section second frequency resonator 380 may comprise a ground side trace second section second frequency resonator first portion 386, a ground side trace second section second frequency resonator second portion 388, and a ground side trace second section second frequency resonator short circuit 390.

Driven side trace 114 and ground side trace 118 may be symmetric about symmetry line 202. Also, driven element board 104 may be perpendicular to feed board 102 at antenna plane 204.

Figure 4:
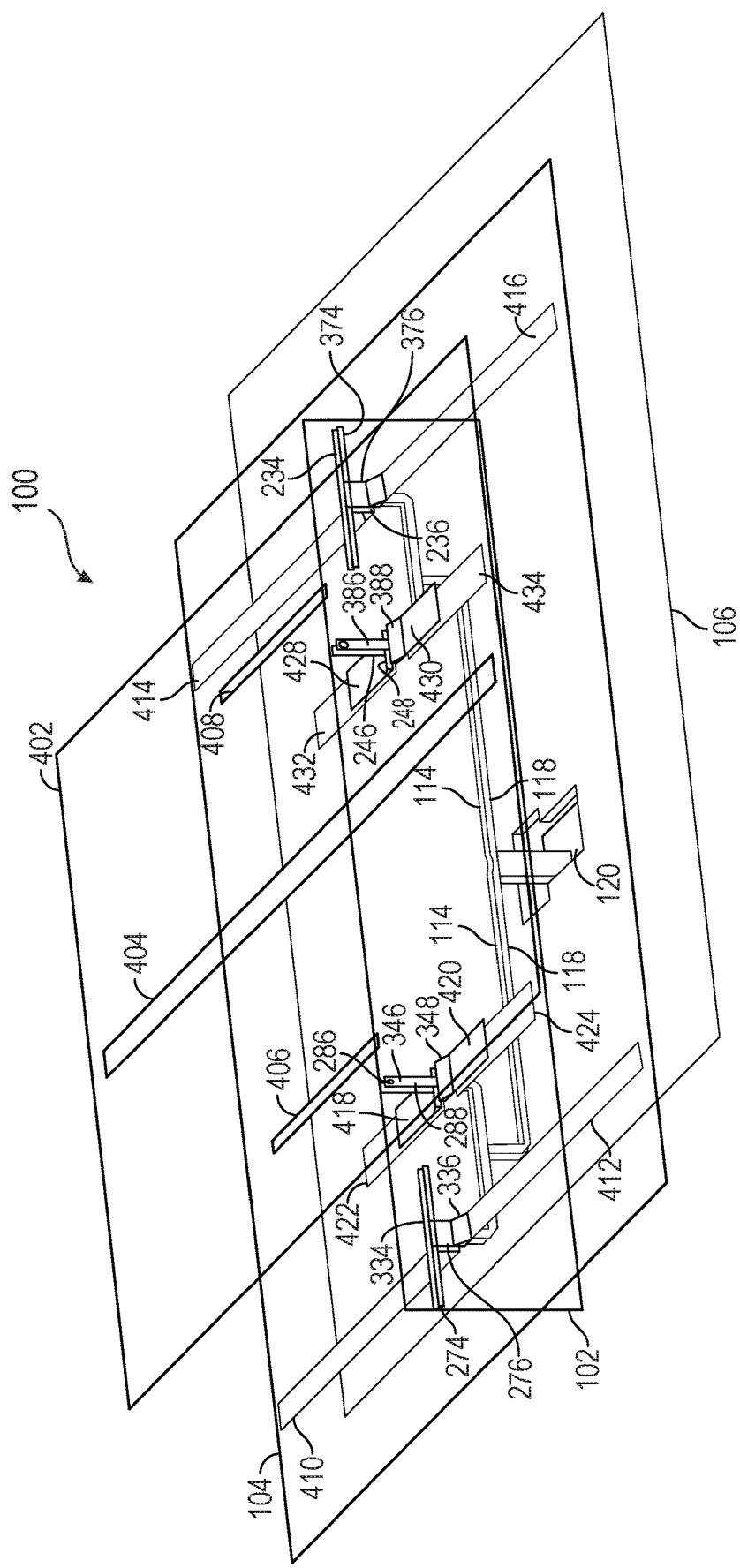
FIG. 4 shows a top view dual-band antenna system.

FIG. 4 shows dual-band antenna system 100 in more detail. As shown in FIG. 4, dual-band antenna system 100 may include a director board 402. Director board 402 may comprise a first frequency director 404, a second frequency first director 406, and a second frequency second director 408.

In addition to director board 402, FIG. 4 shows first frequency driven elements and second frequency driven elements. First frequency driven elements may include a first frequency driven element first section 410, a first frequency driven element second section 412, a first frequency driven element third section 414, and a first frequency driven element fourth section 416. Second frequency driven elements may comprise a second frequency driven element first section 418, a second frequency driven element second section 420, a second frequency driven element third section 422, a second frequency driven element fourth section 424, a second frequency driven element fifth section 428, a second frequency driven element sixth section 430, a second frequency driven element seventh section 432, and a second frequency driven element eighth section 434.

As shown in FIG. 4, first frequency driven element first section 410 may be connected to driven side trace second section first frequency resonator second portion 276, first frequency driven element second section 412 may be connected to ground side trace first section first frequency resonator second portion 336, first frequency driven element third section 414 may be connected to driven side trace first section first frequency resonator second portion 236, and first frequency driven element fourth section 416 may be connected to ground side trace second section first frequency resonator second portion 376. The aforementioned connections may be made, for example, by soldering. These connections may be known as feed points.

Similarly, second frequency driven element first section 418 may be connected to driven side trace second section second frequency resonator second portion 288, second frequency driven element second section 420 may be connected to ground side trace first section second frequency resonator second portion 348, second frequency driven element fifth section 428 may be connected to 248, and second frequency driven element sixth section 430 may be connected to ground side trace second section second frequency resonator second portion 388. The aforementioned connections may be made, for example, by soldering. These connections may be known as feed points.

Second frequency driven element third section 422 may be placed on the bottom of driven element board 104 opposite and complementary to second frequency driven element first section 418. Second frequency driven element fourth section 424 may be placed on the bottom of driven element board 104 opposite and complementary to second frequency driven element second section 420. Second frequency driven element seventh section 432 may be placed on the bottom of driven element board 104 opposite and complementary to second frequency driven element fifth section 428. And second frequency driven element eighth section 434 may be placed on the bottom of driven element board 104 opposite and complementary to second frequency driven element sixth section 430. Consequently, embodiments of the disclosure may comprise, for example, two in-phase Yagis operating over a first frequency (e.g., 2.4 GHz) and a second frequency (e.g., 5 GHz), however, at the first frequency, the two driven elements may share the same director.

A Yagi-Uda antenna may consist of a driven element, a parasitic reflector, and a parasitic director. The choice of element may depend on the application (e.g., size, pattern/bandwidth requirements, desired polarization, etc.). The impedance bandwidth of the Yagi-Uda antenna may be limited by the capacitance between the driven element and the reflector (or ground plane), the size of the director with respect to the driven element, and the element-to-element distances, which may be optimal only at a single frequency. Thus, the optimization of the impedance and radiation patterns may be conducted over a constrained parameter space that consists of the lengths of the elements and how they are spaced.

Consistent with embodiments of the disclosure, in order to achieve a dual-broadband response from a narrow-band configuration, the parameter space may be increased using a pair of microwave resonators (e.g., driven side trace first section first frequency resonator 228 and driven side trace first section second frequency resonator 240). Consistent with embodiments of the disclosure, the impedance operation may be described by examining equivalent microwave circuits at the first frequency (for example, but not limited to, 2.4 GHz) and the second frequency (for example, but not limited to, 5 GHz). The equivalent microwave circuits may be explained using driven side trace first section 210; however, the same analysis can apply to driven side trace second section 212, ground side trace first section 310, and ground side trace second section 312.

As shown in FIG. 2A and FIG. 3A, there may be a microwave resonator (e.g., driven side trace first section first frequency resonator 228 and driven side trace first section second frequency resonator 240) near the feed point of each driven element. For example, near the first frequency (e.g., 2.4 GHz) driven element's feed point is placed a shunt open stub (e.g., driven side trace first section first frequency resonator 228) and near the second frequency (e.g., 5 GHz) driven element's feed point is placed a shunt short circuit (e.g., driven side trace first section second frequency resonator 240). To create the short circuit for the shunt, driven side trace first section second frequency resonator short point 250 may be shorted to ground side trace second section second frequency resonator short point 390. Similarly, driven side trace second section second frequency resonator short point 290 may be shorted to ground side trace first section second frequency resonator short point 350.

The length of the open shunt stub may control the impedance match of the first frequency (e.g., 2.4 GHz) Yagi. The length of the short circuit line (i.e., L1+L2) may comprise approximately a guided quarter wavelength (i.e., $\lambda_g/4$) at the first frequency (e.g., 2.4 GHz). In other words, $L1+L2 \approx \lambda_g/4$. As shown in FIG. 2A and FIG. 3A, L1 may equal the length of driven side trace first section second frequency branch sub feeder second portion 244 plus the length of driven side trace first section second frequency resonator 240. L2 may be equal to the length of driven side trace first section second frequency branch sub feeder first portion 242. Thus, at the second feed-line split (e.g., driven side trace first section split 216), the input impedance looking into the second frequency branch (e.g., driven side trace first section second frequency branch 220) is high at the first frequency (e.g., 2.4 GHz). This boundary condition may force a majority of the current through the first frequency branch (e.g., driven side trace first section first frequency branch 218). Also, the second frequency driven element may appear as a low shunt capacitance (e.g., to the first frequency branch current) and the overall input impedance of the line section may be dominated by this quarter-wave resonator.

FIG. 2B and FIG. 3B may illustrate the second frequency (e.g., 5 GHz) equivalent microwave circuit. For example, at the second frequency (e.g., 5 GHz), the first frequency (e.g., 2.4 GHz) branch (driven side trace first section first frequency branch 218) may form a full-wave resonator. Also, the first frequency (e.g., 2.4 GHz) driven element (e.g., approximately a full-wave dipole at 5 GHz) may be close to a half-wavelength from the second feed-line split (e.g., driven side trace first section split 216). Both of these in tandem may produce a high impedance point at the second feed-line split (e.g., driven side trace first section split 216) and enhance the impedance bandwidth of the aforementioned current divorcing effect. Thus, the current may be forced through the second frequency (e.g., 5 GHz) branch (e.g., driven side trace first section second frequency branch 220). An open shunt stub (e.g., driven side trace first section second frequency resonator second portion 248) may be placed at the second frequency (e.g., 5 GHz) driven element's feed point to increase the soldering surface area. In parallel with the second frequency (e.g., 5 GHz) driven element may be placed a shunt shorted quarter wave resonator (e.g., driven side trace first section second frequency resonator first portion 246), which may have little effect on the impedance looking into the driven element at the feed point. An optimization of the structure over pattern and impedance may commence once the physical lengths are assigned. In other words, with reference to FIG. 2B and FIG. 3B, $L3+L4+L5+L6 \approx \lambda_g$ and $L7 \approx \lambda_g/4$ at the second frequency (e.g., 5 GHz) where $\lambda_g$ is a guided wavelength at the second frequency (e.g., 5 GHz). As shown in FIG. 2B and FIG. 3B, L3≈the height of driven side trace first section first frequency resonator 228, L4≈the width of driven side trace first section first frequency resonator first portion 234, L5≈the length of driven side trace first section first frequency branch sub feeder second portion 232, L6≈the length of driven side trace first section first frequency branch sub feeder first portion 230, and L7≈the height of driven side trace first section second frequency resonator 240.

As described above, FIG. 2A, FIG. 2B, FIG. 3A, and FIG. 3C may illustrate a first frequency branch geometry and a second frequency branch geometry. For example, driven side trace first section first frequency branch 218 may comprise the first frequency branch geometry that may cause a majority of a current of a signal fed into driven side trace first section split 216 to feed driven side trace first section second frequency branch 220 when the signal comprises the second frequency (e.g., 5 GHz). Furthermore, driven side trace first section second frequency branch 220 may comprise a second frequency branch geometry that may cause the majority of the current of the signal fed into driven side trace first section split 216 to feed driven side trace first section first frequency branch 218 when the signal comprises the first frequency (e.g., 2.4 GHz). Driven side trace first section 210 is used for this example, however, the first frequency branch geometry and the second frequency branch geometry may also apply, for example, to driven side trace second section 212, ground side trace first section 310, and ground side trace second section 312.

As shown in FIG. 4, all driven elements may reside on the same circuit board driven (e.g., element board 104) and its placement above ground plane 106 may be optimized for dual-band operation. Each driven second frequency (e.g., 5 GHz) element (2) may have its own director that is approximately separated by a quarter wavelength. The directivity enhancing characteristic of the director may increase with frequency over the second frequency band. At the first frequency (e.g., 2.4 GHz), to limit the required height off ground plane 106 and preserve the pattern quality over the second frequency (e.g., 5 GHz), a first frequency (e.g., 2.4 GHz) director (e.g., first frequency director 404) may be placed between the two second frequency (e.g., 5 GHz) directors (e.g., second frequency first director 406 and second frequency second director 408). The spacing between the first frequency (e.g., 2.4 GHz) driven elements and their director is approximately a quarter-wavelength. The separation distance and high mutual impedance of the first frequency (e.g., 2.4 GHz) director does not impact the radiation patterns of the second frequency (e.g., 5 GHz) Yagis.

Figure 5:
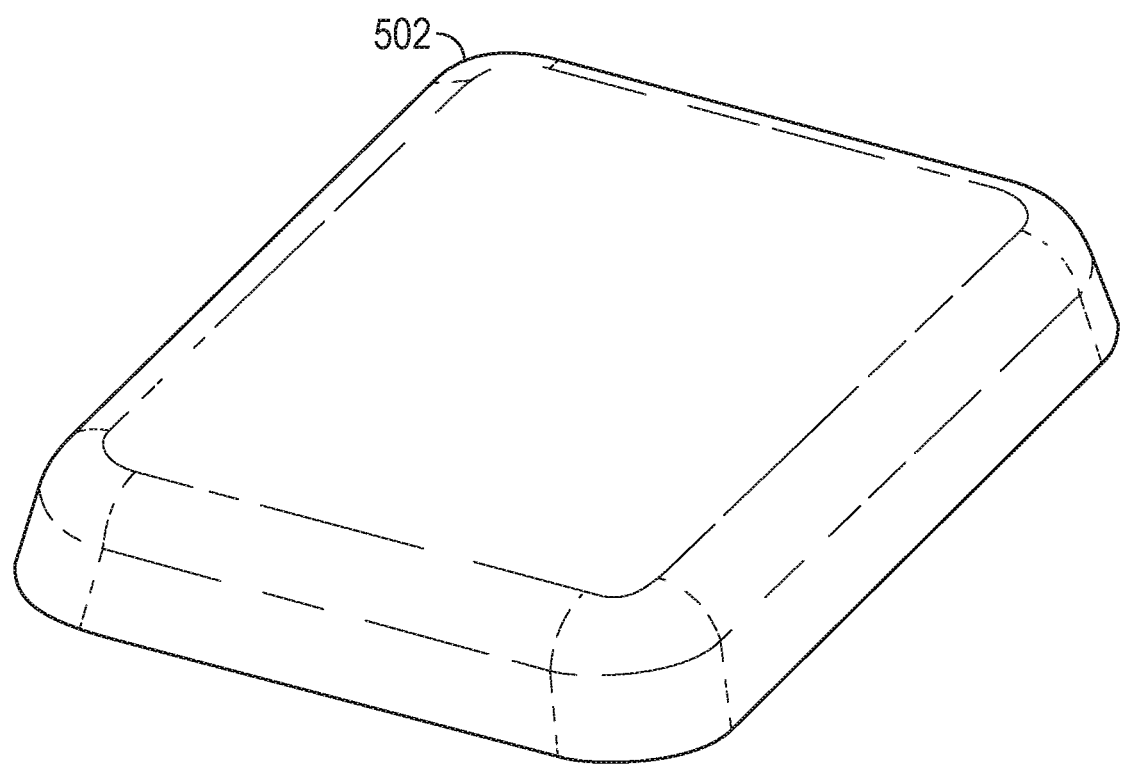
FIG. 5 shows a radome.

FIG. 5 shows a radome 502. Director board 402 may be snapped or otherwise disposed within radome 502. Radome 502 may be mounted to ground plane 106 to cover dual-band antenna system 100 as shown in FIG. 5.

Consistent with embodiments of the disclosure, dual-band antenna system 100 may comprise three circuit boards (feed board 102, driven element board 104, and director board 402), ground plane 106, radome 502, supports (first support 108 and second support 110), and coaxial cable 122. Coaxial cable 122 may be soldered directly to feed board 102. Feed board 102 may feed the driven elements and may enable dual-band operation. Driven element board 104 may be interlocked with feed board 102 and comprise the radiating elements. Feed board 102 and driven element board 104 may be held together using two slotted supports (e.g., first support 108 and second support 110), which may act as a fixture for soldering and secure the boards in the final assembly. The supports may be heat-staked to ground plane 106. Director board 402 may be spaced off driven element board 104 and may be heat-staked to radome 502.

Embodiments of the disclosure may include a method of making dual-band antenna system 100. The assembly of dual-band antenna system 100 may be as follows. First, feed board 102 and driven element board 104 may be captured by first support 108 and second support 110. First support 108 and second support 110 may then be heat-staked to ground plane 106. This subassembly of feed board 102, driven element board 104, first support 108, and second support 110 may only be inserted one way into ground plane 106 because coaxial cable 122 may point towards the radio equipment. Next, feed board 102 and driven element board 104 may be soldered, for example, at eight distinct points (e.g., four dipoles) while held together by first support 108 and second support 110. Then coaxial cable 122 may be clocked appropriately and soldered to feed board 102 (e.g., the transition may be optimized for minimal return loss). Next, director board 402 may be heat-staked to radome 502 and then radome 502 may be assembled to ground plane 106, which as an assembly, may then be attached to a chassis of dual-band antenna system 100.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   connecting a feed board to a driven element board while the feed board and the driven element board are held together by a first support and a second support, the feed board, the driven element board, the first support, and the second support comprising an assembly, wherein the feed board comprises:
   a trace split;
   a first frequency branch being fed from the trace split, the first frequency branch comprising a first frequency resonator, the first frequency resonator comprising a shunt open stub;
   a second frequency branch being fed from the trace split, the second frequency branch comprising a second frequency resonator, the second frequency resonator comprising a shunt short circuit; and
   a first frequency driven element section connected to a feed point in the first frequency branch, the feed point being located approximately a guided half-wavelength, at a second frequency, from the trace split;
   a second frequency driven element first section, wherein the first frequency driven element section and the second frequency driven element first section are disposed on a top of the driven element board, wherein the driven element board is perpendicular to the feed board at an antenna plane, the antenna plane being below the first frequency resonator and the second frequency resonator;
   wherein a length of the second frequency branch is approximately a guided quarter-wavelength, at a first frequency, measured from the trace split, and
   wherein the first frequency resonator is a full-wave resonator with the first frequency branch having a length of approximately a full guided wavelength at the second frequency measured from the trace split;
   heat-staking the assembly to a ground plane;
   clocking a coaxial cable; and
   connecting the coaxial cable to the feed board.

2. The method of claim 1, further comprising:
   heat-staking a director board to a radome; and
   assembling the radome to the ground plane.

3. The method of claim 1, further comprising soldering the feed board and the driven element board at eight distinct points while held together by the first support and the second support.

4. The method of claim 1, further comprising a second frequency driven element second section placed on a bottom of the driven element board opposite and complementary to the second frequency driven element first section.

5. The method of claim 1, wherein
   the first frequency branch comprises a first frequency branch geometry that causes a majority of a current of a signal fed into the trace split to feed the second frequency branch when the signal comprises the second frequency, and wherein the second frequency branch comprises a second frequency branch geometry that causes the majority of the current of the signal fed into the trace split to feed the first frequency branch when the signal comprises the first frequency.

6. The method of claim 5, wherein the second frequency is approximately twice the first frequency.

7. The method of claim 5, wherein the first frequency branch geometry comprises the first frequency branch comprising the first frequency resonator, the first frequency resonator comprising the shunt open stub.

8. The method of claim 7, wherein the first frequency resonator is a full-wave resonator with the first frequency branch having a length of approximately a full guided wavelength at the second frequency measured from the trace split.

9. The method of claim 5, wherein the second frequency branch geometry comprises the second frequency branch comprising the second frequency resonator, the second frequency resonator comprising a shunt short circuit.

10. The method of claim 9, wherein a length of the second frequency branch is approximately a guided quarter-wavelength, at the first frequency, measured from the trace split.

11. A method comprising:
connecting a feed board to a driven element board while the feed board and the driven element board are held together by a first support and a second support, the feed board, the driven element board, the first support, and the second support comprising an assembly, wherein the feed board comprises:
a trace split;
a first frequency branch being fed from the trace split;
a second frequency branch being fed from the trace split, wherein the first frequency branch comprises a first frequency branch geometry that causes a majority of a current of a signal fed into the trace split to feed the second frequency branch when the signal comprises a second frequency, and wherein the second frequency branch comprises a second frequency branch geometry that causes the majority of the current of the signal fed into the trace split to feed the first frequency branch when the signal comprises a first frequency; and
a first frequency driven element section connected to a feed point in the first frequency branch, the feed point being located approximately a guided half-wavelength, at the second frequency, from the trace split
a second frequency driven element first section, wherein the first frequency driven element section and the second frequency driven element first section are disposed on a top of the driven element board, and wherein the driven element board is perpendicular to the feed board at an antenna plane, the antenna plane being below the first frequency resonator and the second frequency resonator;
soldering the feed board and the driven element board at eight distinct points while held together by the first support and the second support; and
heat-staking the assembly to a ground plane.

12. The method of claim 11, further comprising:
heat-staking a director board to a radome; and
assembling the radome to the ground plane.

13. The method of claim 11, further comprising:
clocking a coaxial cable; and
connecting the coaxial cable to the feed board.

14. The method of claim 11, wherein
the first frequency branch comprises a first frequency resonator, the first frequency resonator comprising a shunt open stub;
the second frequency branch comprises a second frequency resonator, the second frequency resonator comprising a shunt short circuit; and
wherein a length of the second frequency branch is approximately a guided quarter-wavelength, at the first frequency, measured from the trace split, and
wherein the first frequency resonator is a full-wave resonator with the first frequency branch having a length of approximately a full guided wavelength at the second frequency measured from the trace split.

15. The method of claim 14, further comprising a second frequency driven element first section.

16. The method of claim 11, further comprising a second frequency driven element second section placed on a bottom of the driven element board opposite and complementary to the second frequency driven element first section.

17. The method of claim 11, wherein the second frequency is approximately twice the first frequency.

18. The method of claim 11, wherein the first frequency branch geometry comprises the first frequency branch comprising the first frequency resonator, the first frequency resonator comprising the shunt open stub.

19. The method of claim 18, wherein the first frequency resonator is a full-wave resonator with the first frequency branch having a length of approximately a full guided wavelength at the second frequency measured from the trace split.

20. The method of claim 11, wherein the second frequency branch geometry comprises the second frequency branch comprising the second frequency resonator, the second frequency resonator comprising a shunt short circuit.

* * * * *